(12) United States Patent
Smith

(10) Patent No.: US 6,835,127 B2
(45) Date of Patent: Dec. 28, 2004

(54) CLIP TO HOLD IN PLACE AIR CONDITIONING VENTS IN VEHICLES

(76) Inventor: Alvin L. Smith, 1464 Marshall Rd., Vacaville, CA (US) 95687

( * ) Notice: Subject to any disclaimer, the term of this patent is extended or adjusted under 35 U.S.C. 154(b) by 0 days.

(21) Appl. No.: 10/642,620

(22) Filed: Aug. 19, 2003

(65) Prior Publication Data

US 2004/0152413 A1 Aug. 5, 2004

Related U.S. Application Data

(60) Provisional application No. 60/411,388, filed on Sep. 18, 2002.

(51) Int. Cl.[7] .................................................. B60H 1/34
(52) U.S. Cl. ........................ 454/155; 454/152; 292/292
(58) Field of Search ................................ 454/370, 143, 454/152, 155; 292/289, 292

(56) References Cited

U.S. PATENT DOCUMENTS

| | | | |
|---|---|---|---|
| 2,106,093 A | * | 1/1938 | Goese ........................ 126/292 |
| 2,285,829 A | * | 6/1942 | Maage, Jr. .................. 137/556 |
| 3,601,034 A | * | 8/1971 | Thorne ....................... 454/309 |
| 4,503,755 A | * | 3/1985 | Nordquist et al. .......... 454/335 |
| 4,646,625 A | * | 3/1987 | Schroeder ................... 454/370 |
| 4,796,518 A | * | 1/1989 | Murray ....................... 454/155 |
| 5,690,550 A | | 11/1997 | Mikowski |
| 6,059,653 A | | 5/2000 | Gehring et al. |
| 6,264,887 B1 | | 7/2001 | Farmer |

* cited by examiner

Primary Examiner—Derek S. Boles
(74) Attorney, Agent, or Firm—Richard C. Litman

(57) ABSTRACT

A clip to hold in place air conditioning vents in vehicles is an arcuate device adapted to snap onto the shaft between the end wall of the rotor and the end wall of the housing in an air conditioning vent. The clip is substantially V-shaped, having two diagonally opposed sides which are integrally connected at one end to form a closed portion and diverge outwardly at their opposing ends to form an open portion. The open portion is adapted to receive and envelop the vent shaft. The clip's curvature is adapted to allow the spaced sides to frictionally engage the end wall of the housing and the convex surface to frictionally engage the end wall of the rotor. Once mounted in the vent, the clip positively positions the rotor at a selected angle.

3 Claims, 3 Drawing Sheets

CLIP TO HOLD IN PLACE AIR CONDITIONING VENTS IN VEHICLES

CROSS-REFERENCE TO RELATED APPLICATION

This application claims the benefit of U.S. Provisional Patent Application Ser. No. 60/411,388, filed Sep. 18, 2002.

BACKGROUND OF THE INVENTION

1. Field of the Invention

The present invention relates generally to clips, and particularly to a clip for holding in place an air conditioning vent in a vehicle.

2. Description of Related Art

As an automobile grows older, frequent maintenance of the automobile and replacement of the automobile parts becomes more and more necessary. While many people are willing to invest time and money in repairing and replacing parts which are vital to the functioning and safety of the automobile, many fail to keep up with the maintenance of less significant automobile parts, primarily because of the associated costs. Air vents in automobiles, for example, are generally the first of such parts to become defective. Vents in automobiles have air direction deflectors or louver blades on a rotor which are rotatable about a vertical or horizontal axis for discharge of air at selected angles. As a result of wear of the bearings and vibrations due to travel, the rotors eventually become loose and tend to shift from a selected position. Replacing or repairing a defective vent may be labor intensive and costly. Consequently, an inexpensive device which prevents displacement of the rotor without requiring repair or replacement of the vent would be desirable. There has been very little advancement towards this end.

U.S. Pat. No. 4,646,625, issued Mar. 3, 1987 to R. Schroeder, discloses a spring clip which is adapted to fit in the gap between the rotor and housing of an automobile ventilation duct to secure the louvers in a fixed position. The spring clip has opposed spring leaves forming a wedge and outturned handles which protrude from the vent to facilitate manipulation. The handles, while useful for inserting and removing the spring clip, are obtrusive and likely to be dislocated if other items in the car are inadvertently brought into contact with them.

Other patents relating to vents and vent clips include U.S. Pat. No. 5,690,550, issued Nov. 25, 1997 to M. Mikowski (outlet assembly for directing air in a plurality of directions as used particularly in vehicles); U.S. Pat. No. 6,059,653, issued May 9, 2000 to T. Gehring et al. (air outlet assemblies having a controlled effort generation between a boss and a boss retention device as they are employed in air outlet assemblies for motor vehicles); U.S. Pat. No. 6,264,887, issued Jul. 24, 2001 to M. Farmer (a clip device adapted to be connected to an air vent fin for allowing perfumed materials to the surrounding air of a vehicle); German patent 3,916,541, published Nov. 22, 1990 (air vent which is held in place by spring clip); and French patent 2,756,184, published May 29, 1998 (air freshener with clip on back for fastening to fins of an air vent).

None of the above inventions and patents, taken either singly or in combination, is seen to describe the instant invention as claimed.

SUMMARY OF THE INVENTION

The clip to hold in place air conditioning vents in vehicles is an arcuate device adapted to snap onto the shaft between the end wall of the rotor and the end wall of the housing in an air conditioning vent. The clip is substantially V-shaped, having two diagonally opposed sides which are integrally connected at one end to form a closed portion and diverge outwardly at their opposing ends to form an open portion. The clip also has a convex surface and a concave surface. When the clip is mounted in the vent, the concave surface faces the end wall of the housing and the convex surface faces the end wall of the rotor. The open portion is adapted to receive and envelop the vent shaft. The clip's curvature is adapted to allow the spaced sides to frictionally engage the end wall of the housing and the convex surface to frictionally engage the end wall of the rotor. Once mounted in the vent, the clip positively positions the rotor at a selected angle.

Accordingly, it is a principal object of the invention to position the rotor of a defective automobile air conditioning vent at a desired angle without having to repair or replace the vent.

It is another object of the invention to provide a clip to hold in place the rotor of an automobile air conditioning vent.

It is a further object of the invention to provide a clip to hold in place air conditioning vents in vehicles which can be easily installed and removed.

Still another object of the invention is to provide a clip to hold in place air conditioning vents in vehicles which is not obtrusive when mounted in the dashboard.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
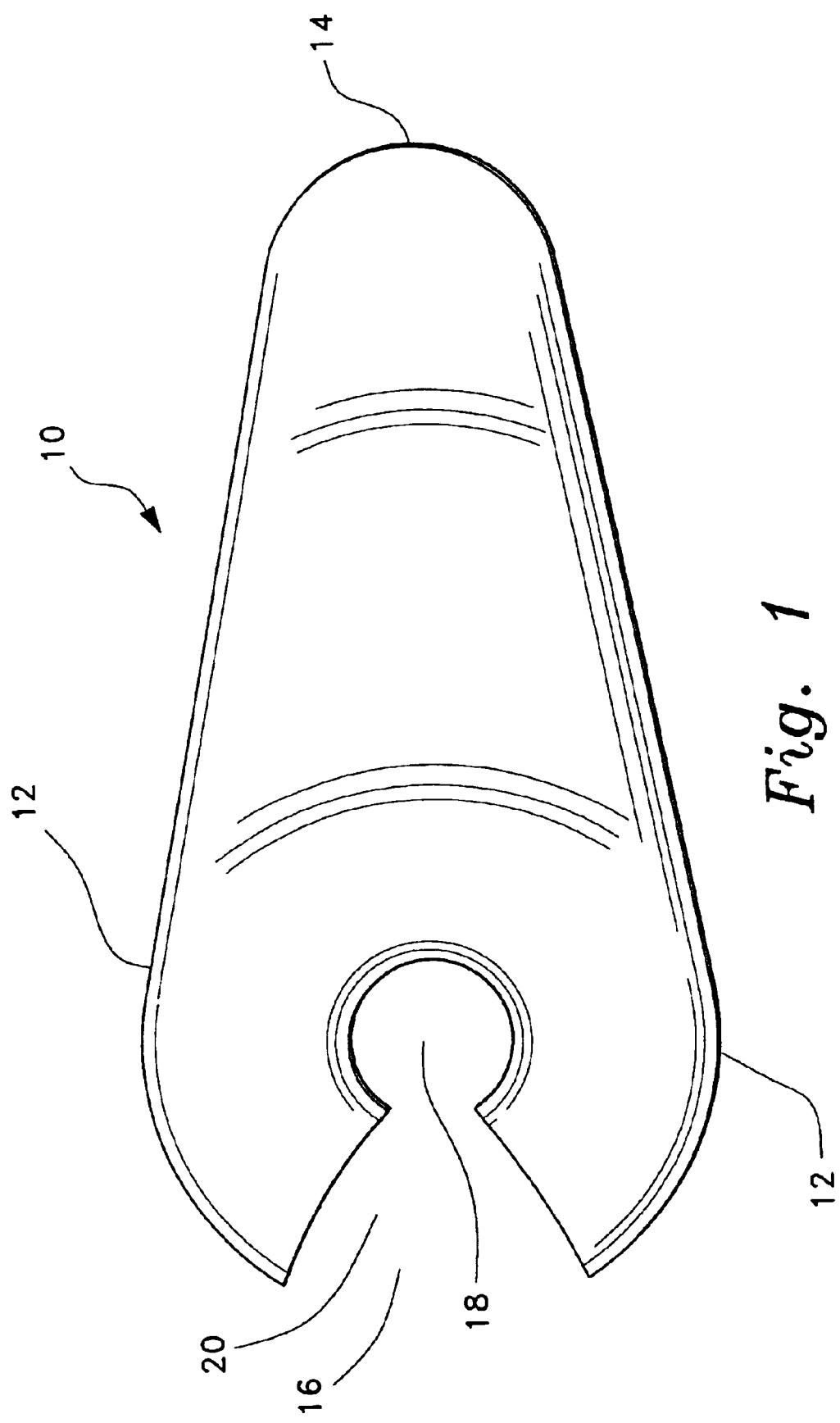
FIG. 1 is a top view of a clip to hold in place air conditioning vents in vehicles according to the present invention.

The present invention is a clip to hold in place air conditioning vents in vehicles, designated generally as 10 in the drawings. As can be seen in FIG. 1, the clip 10 is substantially V-shaped, comprising a pair of diagonally opposed sides 12 which are integrally connected at one end to form a closed portion 14 and spaced apart at their respective opposing ends to form an open portion 16. The open portion 16 is keyhole-shaped, having a circular cavity 18 and a V-shaped channel 20 which opens into the circular cavity 18.

Figure 2:
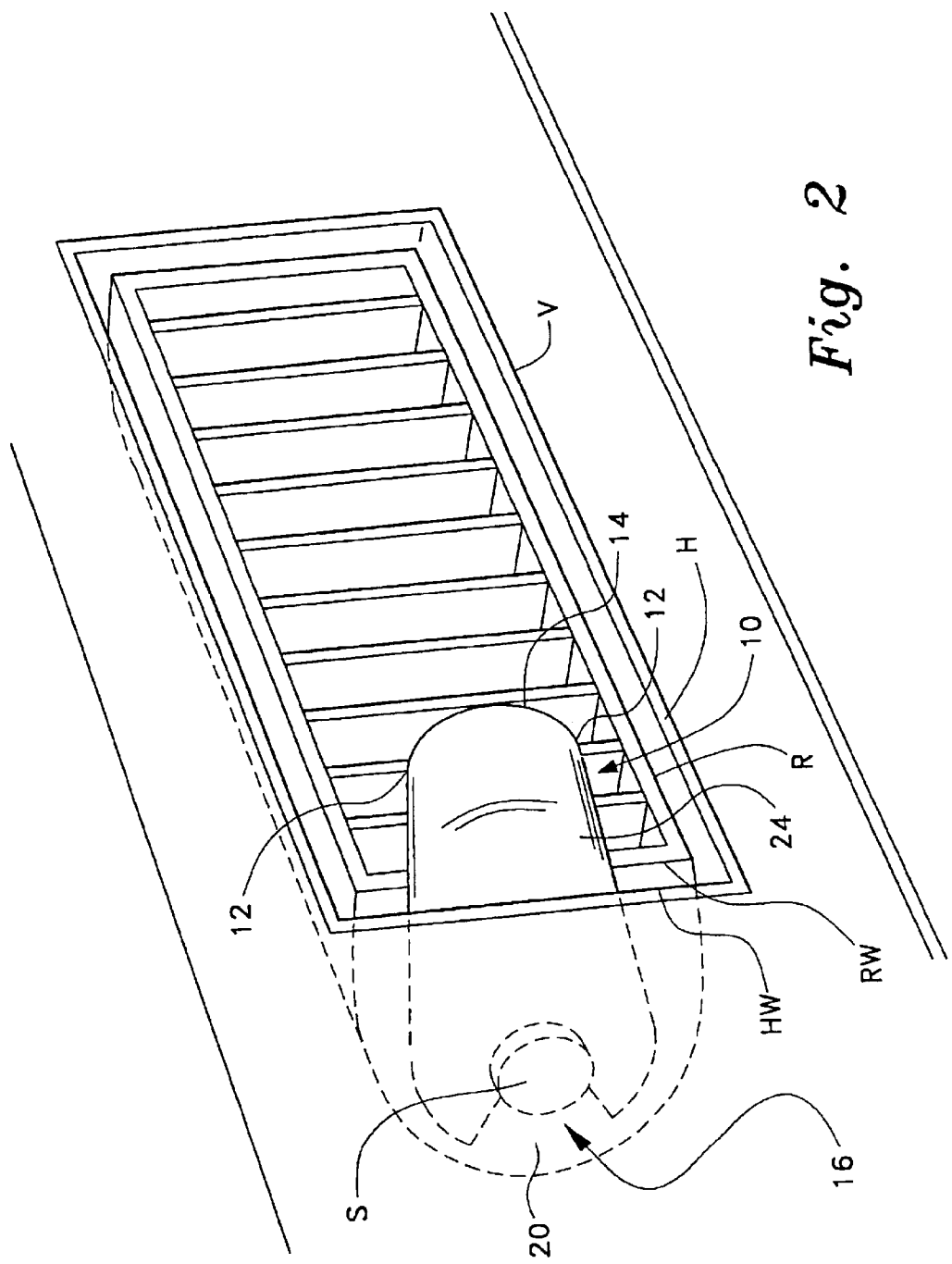
FIG. 2 is an environmental perspective view of a clip to hold in place air conditioning vents in vehicles when mounted on the shaft of the vent.

As is depicted in FIG. 2, the clip 10 is adapted to provide a shim between the rotor end wall RW and the housing end wall HW of a conventional automobile ventilation outlet V having a conventional rotor R, a housing H, and a shaft S. The circular cavity 18 is adapted to have a diameter slightly greater than the diameter of the shaft S. When the open portion 16 is inserted into the vent V, the V-shaped channel 20 guides the clip 10 onto the shaft S and expands slightly to allow the circular cavity 18 to receive and envelop the shaft S. The closed portion 14 protrudes only slightly from the vent V.

Figure 3:
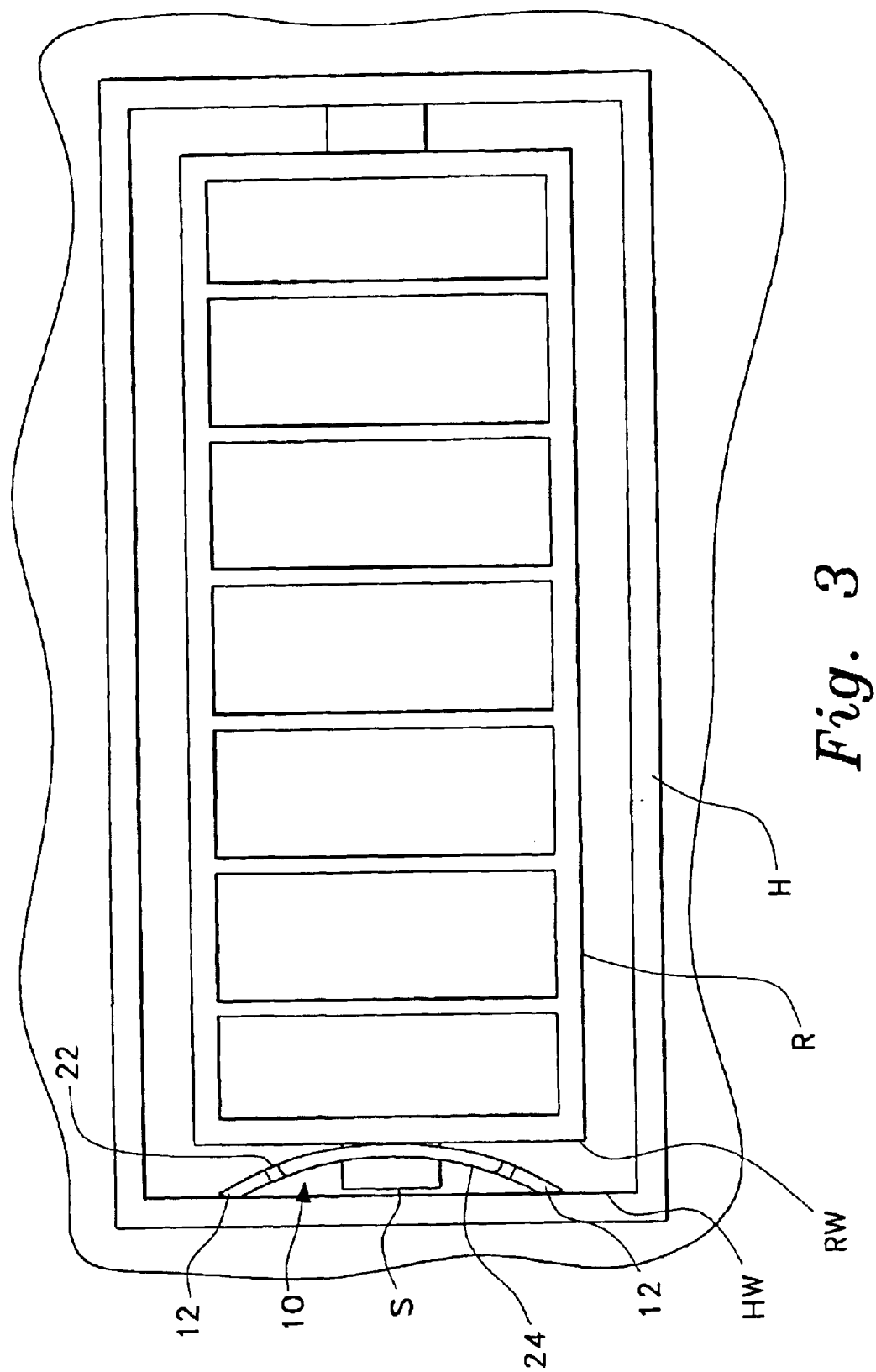
FIG. 3 is an environmental front view of a clip to hold in place air conditioning vents in vehicles when mounted on the shaft of the vent.

Referring to FIG. 3, it can be seen that the clip 10 has a convex surface 22 and a concave surface 24. The concave surface 24 faces the end wall of the housing HW and the convex surface 22 faces the end wall of the rotor RW. The clip's curvature and the resiliency of the clip 10 is adapted to allow the diagonally opposed sides 12 to frictionally engage the end wall of the housing HW and the convex surface 22 to frictionally engage the end wall of the rotor RW once the clip 10 is mounted on the shaft S. In this manner, the clip 10 positively positions the rotor R at a selected angle.

The clip 10 can be made from any flexible, but resilient, lightweight material. Preferably, the clip 10 is made from a lightweight thermoplastic material.

It is to be understood that the present invention is not limited to the sole embodiment described above, but encompasses any and all embodiments within the scope of the following claims.

I claim:

1. An arcuate clip for mounting on a shaft of an automobile air conditioning vent rotor between a rotor end wall and a vent housing end wall, comprising:

a substantially V-shaped body having a pair of diagonally opposed sides having first and second ends, said first ends being integrally connected in order to define a closed portion, the V-shaped body being arcuate, having a concave surface and a convex surface; and an open portion opposing the closed portion;

wherein the open portion is adapted for receiving the shaft of the vent rotor; and wherein the convex surface of the clip is adapted for frictionally engaging the rotor wall and the diagonal sides of the clip are adapted for frictionally engaging the housing wall of the vent in order to prevent rotation of the rotor, thereby maintaining the vent in a fixed position.

2. The arcuate clip of claim 1, wherein the open portion has a circular cavity and a V-shaped channel opening into the circular cavity, the circular cavity being adapted for clipping onto the shaft of the vent rotor.

3. The arcuate clip of claim 1, wherein the clip is made from a lightweight, thermoplastic material.

* * * * *